United States Patent [19]
Burns

[11] 3,866,337
[45] Feb. 18, 1975

[54] APPARATUS FOR DEMONSTRATING ATOMIC STRUCTURE

[76] Inventor: Thomas D. Burns, 3413 Lakeside Drive, Matthews, N.C. 28105

[22] Filed: July 26, 1973

[21] Appl. No.: 382,964

[52] U.S. Cl. .................................. 35/18 A, 35/45
[51] Int. Cl. .......................................... G09b 23/20
[58] Field of Search ......... 35/18 R, 18 A, 45; 40/34

[56] References Cited
UNITED STATES PATENTS

| | | | |
|---|---|---|---|
| 1,838,942 | 12/1931 | Heid | 35/45 |
| 2,516,418 | 7/1950 | Ramsay | 35/18 A |
| 2,601,729 | 7/1952 | Underwood | 35/18 A |
| 3,089,259 | 5/1963 | Miller | 35/45 |

Primary Examiner—Harland S. Skogquist
Attorney, Agent, or Firm—Parrott, Bell, Seltzer, Parks & Gibson

[57] ABSTRACT

An apparatus for demonstrating the theoretical structure of an atom which comprises a circular disc having means representing the nucleus of the atom positioned centrally thereon, and a plurality of electron representing members carried on a number of planetary shafts mounted on the disc. The disc is adapted to be rotated in one direction while the planetary shafts are rotated in the opposite direction such that the electron representing members trace a plurality of elliptical orbits about the nucleus to thereby provide a three dimensional representation of electrons orbiting the nucleus of an atom.

13 Claims, 7 Drawing Figures

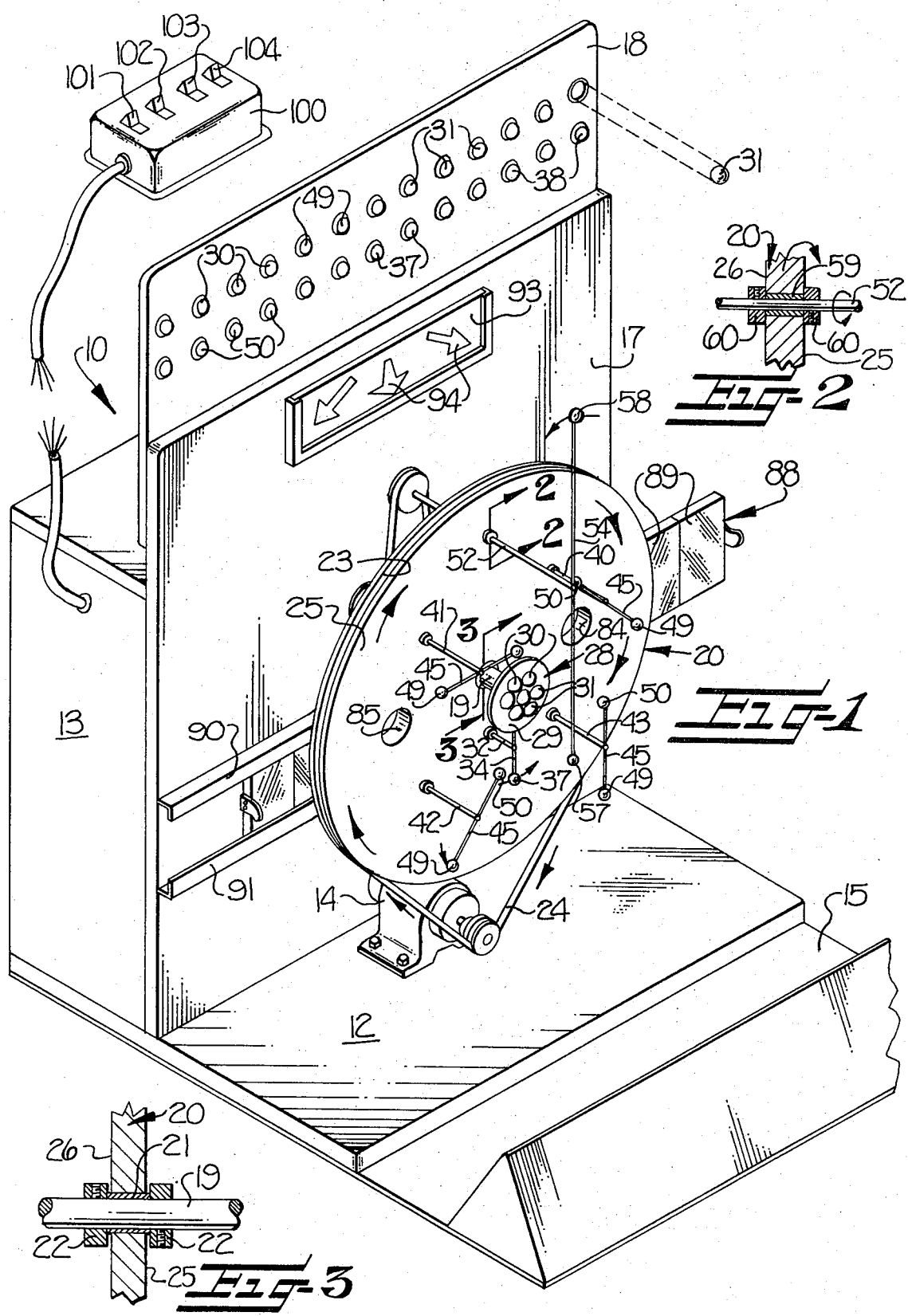

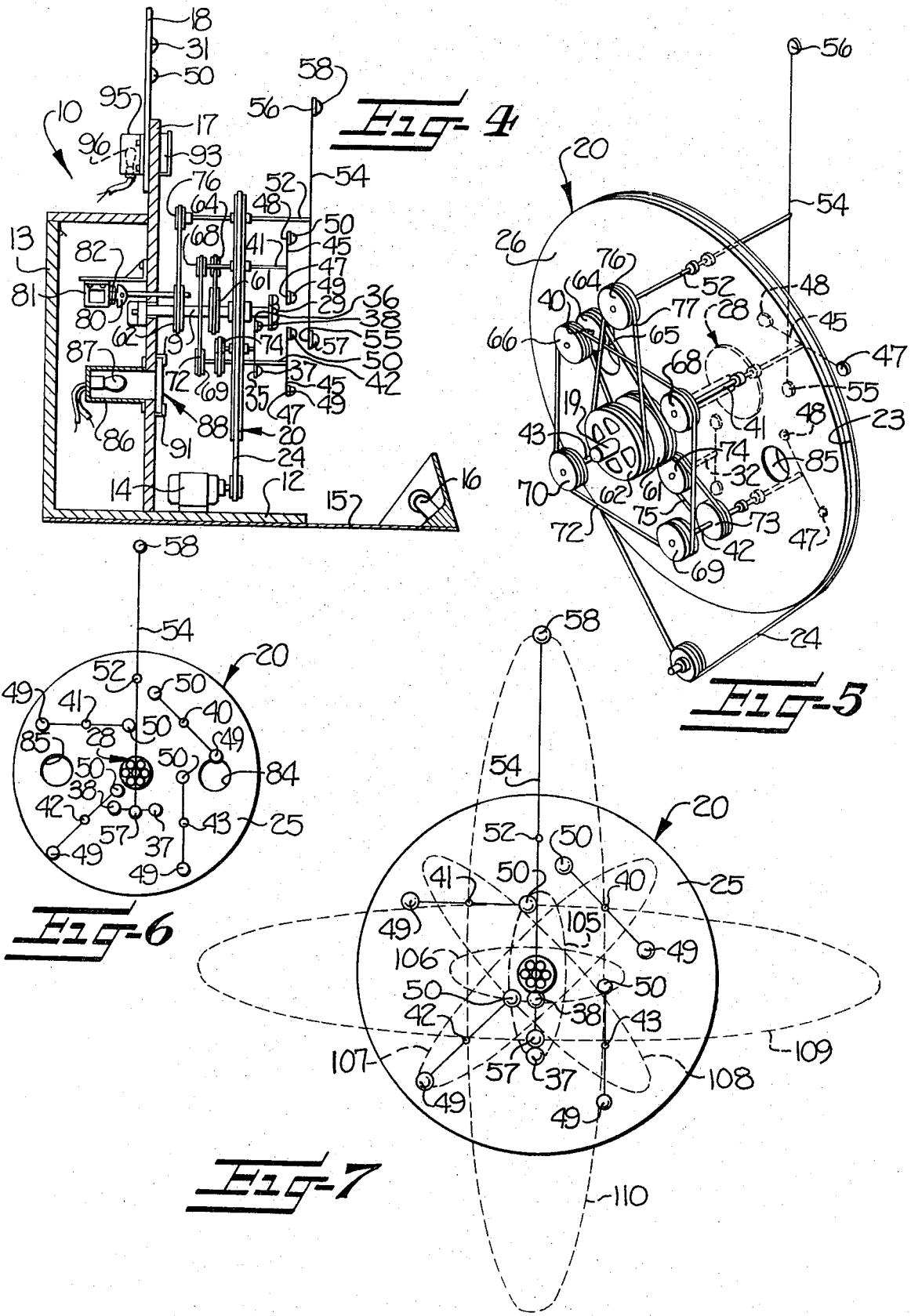

APPARATUS FOR DEMONSTRATING ATOMIC STRUCTURE

The present invention relates to an apparatus for demonstrating the theoretical structure of an atom and which creates the illusion of the electrons moving in circular three dimensional orbits about a stationary nucleus.

It is a generally accepted theory that atoms comprise a number of electrons orbiting about a nucleus which is composed of neutrons and protons. More particularly, it is believed that the electrons arrange themselves in certain stable groups or shells about the nucleus, the first or inner shell comprising two electrons, the second shell comprising eight electrons, and the third and more distant shells comprising eight or more electrons.

It is an object of the present invention to provide an apparatus for visually demonstrating the above theoretical structure of the atom to students or other observers, the apparatus being adapted to create a three dimensional representation of the electrons orbiting the nucleus, and with the electrons positioned in distinct shells.

It is another object of the present invention to provide a demonstration apparatus of the described type which is of simple and inexpensive design, and which is adapted to illustrate a number of different atoms, and their isotopes and ions, by selectively adding or removing members which represent the electrons, neutrons, and protons of the atom.

It is a further object of the present invention to provide a demonstration apparatus of the described type which is adapted to selectively shift the electrons in the outer shell from an elliptical orbit to an erratic orbit to thereby simulate the instability which results in the atom from outside interference such as heat, pressure or radiation.

It is still another object of the present invention to provide a demonstration apparatus of the described type which is adapted to simulate the production of electromagnetic energy in the visible spectrum range by emitting pulses of variously colored light.

These and other objects and advantages of the present invention are achieved in the embodiment illustrated herein by the provision of an apparatus which includes a frame having a central shaft which defines a central axis, a disc mounted on the frame for rotation about the central axis, and a plurality of planetary shafts rotatably carried by the disc. Each of the planetary shafts carries a pair of electron representing members positioned radially from the axis of the associated planetary shaft, and means are provided for simultaneously rotating the disc in a first direction about the central axis, and rotating each of the planetary shafts in the opposite direction such that the electron representing members each trace an elliptical orbit to thereby provide a three dimensional representation of a number of electrons orbiting the nucleus of an atom.

Some of the objects of the invention having been stated, other objects will appear as the description proceeds, when taken in connection with the accompanying drawings, in which:

FIG. 1 is a perspective view of an apparatus embodying the features of the present invention;

FIG. 2 is a fragmentary sectional view taken substantially along the line 2—2 of FIG. 1;

FIG. 3 is a fragmentary sectional view taken substantially along the line 3—3 of FIG. 1;

FIG. 4 is a side elevation view, partly sectioned, of the apparatus shown in FIG. 1;

FIG. 5 is a perspective view of the rear side of the disc of the apparatus shown in FIG. 1, and illustrating a portion of the drive system for the apparatus;

FIG. 6 is a front elevation view of the disc of the apparatus shown in FIG. 1, and illustrating the orientation of the second planetary shafts to produce a plurality of distinct elliptical orbits;

FIG. 7 is a view similar to FIG. 6 on a somewhat enlarged scale, and illustrating the elliptical orbits of the electron representing members.

Referring more specifically to the drawings, the illustrated apparatus includes a frame 10 which comprises a base support member 12 and an upstanding box-like housing 13. The base support member 12 carries a conventional electric motor 14 for the purposes hereinafter set forth, and a thin reinforcing sheet 15 of metal or the like underlies the base support member 12. An ultraviolet lamp 16 is carried along the forward edge of the sheet 15.

The housing 13 is enclosed by a number of interconnected panels, including the front panel 17 which extends upwardly beyond the remainder of the housing. The upper end of the front panel 17 in turn carries a metal plate 18 for the purposes hereinafter set forth. The front panel 17 also rigidly mounts a horizontal central shaft 19 which extends forwardly from the front panel to define a horizontal central axis. The shaft 19 rotatably mounts a circular disc 20 by means of the bearing 21 and end stops 22 (note FIG. 3), and includes a grooved outer periphery 23 adapted to accept a drive belt 24. The belt 24 is operatively connected to the motor 14 so that when the motor 14 is energized, the disc 20 is rotated at a predetermined rotational speed about the fixed central shaft 19. The disc 20 further defines a forwardly facing front surface 25 and a rearwardly facing rear surface 26.

The forward end of the central shaft mounts means 28 for representing the nucleus of an atom. This nucleus representing means 28 includes a transverse plate 29 comprising a magnetic material such as steel fixedly mounted at the forward end of the shaft 19, a plurality of proton representing members 30, and a plurality of neutron representing members 31. The members 30 and 31 preferably comprise a magnet adapted to be magnetically attached to the plate 29, and the members may be covered with an identifying colored fluorescent material to indicate either a proton or neutron. Thus the members 30 and 31 may be selectively attached to and removed from the plate 29 to illustrate different atomic structures, and the members which are not positioned on the plate 29 may be conveniently stored on the plate 18 as best seen in FIG. 1.

A first planetary shaft 32 is rotatably carried by the disc 22, the shaft 32 defining a first shaft axis which extends parallel to and radially spaced from the central axis. In addition, the shaft 32 defines a forward end portion (not numbered) positioned forwardly of the front surface 25 of the disc 20, and a rearward end portion (not numbered) positioned rearwardly of the rear surface 26 of the disc. A transverse rod 34 is mounted on the forward end of the shaft 32 and extends perpendicular to the axis thereof. The transverse rod 34 terminates in two end portions 35 and 36, with the two end portions being disposed 180° apart on opposite sides of the shaft axis and substantially equidistant therefrom.

A first pair of electron representing members 37 and 38 is carried at the forward end of the shaft 32, with one being carried by each of the two end portions 35 and 36. The electron representing members 37 and 38 take the form of magnets generally similar to the members 30 and 31 of the nucleus representing means, whereby the electron representing members 37 and 38 may be selectively removed from the rod 34 and positioned on the storage plate 18. Also, the members 37 and 38 may be coated with a suitably colored fluorescent material to identify them as electron representing members of the first or inner electron shell.

A second group of four planetary shafts 40, 41, 42 and 43 are rotatably carried by the disc 20, with each of these second planetary shafts defining a second shaft axis which extends parallel to and radially spaced from the central axis. Also, the axes formed by the second shafts 40, 41, 42 and 43 are positioned in a generally evenly spaced circular arrangement about the central axis, and radially beyond the axis of the first shaft 32. As seen in FIG. 1, each of the second planetary shafts includes a forward end portion (not numbered) positioned forwardly of the front surface 25 of the disc, and a rearward end portion (not numbered) positioned rearwardly of the disc. A transverse rod 45 is mounted at the forward end of each of the shafts 40–43 and extends perpendicular to the axis of the associated shaft. Each of the rods 45 is generally similar to the rod 34, although somewhat longer in length, and includes two metallic end portions 47 and 48 which are positioned on opposite sides of the shaft and substantially equidistant therefrom. In addition, electron representing members 49 and 50 are carried on the two end portions 47 and 48 of the rod 45 respectively, the members 49 and 50 comprising a magnet coated with a suitably colored fluorescent material to identify the second shell of electrons orbiting the nucleus.

A third planetary shaft 52 is rotatably carried by the disc 22, the third shaft 52 defining a third shaft axis which extends parallel to the central axis and radially beyond the axes of the shafts 40–43. The third shaft 52 includes a forward end portion (not numbered) positioned forwardly of the front surface 25 and a rear end portion (not numbered) positioned rearwardly of the rear surface 26. The forward end of the shaft 52 mounts an elongated transverse rod 54 which extends perpendicular to the axis of the shaft and terminates in two metallic end portions 55 and 56 which are positioned on opposite sides of the shaft and substantially equidistant therefrom. A pair of electron representing members 57 and 58 are carried on the end portions 55 and 56 respectively, the members 57 and 58 being similar to the above described members 37, 38, 49 and 50 in that they comprise a magnet colored with a fluorescent material to identify the third or outermost electron shell. The third shaft 52 is rotatably mounted to the disc 20 by means of the bearing 59 and end stops 60 as shown in FIG. 2, this structure also being representative of the manner in which the shafts 32 and 40–43 are mounted on the disc. Also, it will be noted that the transverse rod 54 is considerably longer than the rods 34 and 45 for the reasons to become apparent.

As noted above, the disc 20 is rotated in a predetermined direction and at a predetermined speed upon the motor 14 being energized. Means are also provided for rotating all of the planetary shafts 32, 40–43 and 52 about their respective axes while the disc 22 is being rotated, the rotation of the planetary shafts being in a direction opposite the direction of rotation of the disc and at a rotational speed substantially corresponding to the predetermined rotational speed of the disc. This means for rotating the planetary shafts includes a main pulley 61 fixedly mounted on the central shaft 19 rearwardly of the disc 20, and an auxiliary pulley 62 rotatably mounted on the central shaft 19 and immediately adjacent the main pulley 61.

The rear end portion of each of the shafts 32, 40–43 and 52 in turn fixedly mounts at least one pulley as best seen in FIG. 5. In particular, the shaft 40 carries a first pulley 64 which is operatively connected to the main pulley 61 by means of the belt 65, and a second pulley 66 which is operatively connected to the pulleys 68, 69 and 70 of the shafts 41, 42 and 43, respectively, by means of the belt 72. The shaft 42 carries an additional pulley 73 which is operatively connected to the pulley 74 of the shaft 32 by means of the belt 75, and the third planetary shaft 52 carries a pulley 76 which is operatively connected to the auxiliary pulley 62 by means of the belt 77. Thus as will be apparent, the rotation of the disc 20 by the motor 14 causes the rotation of each of the planetary shafts 32, 40–43 and 52 in a direction opposite to the rotational direction of the disc 22. In addition, it will be noted from FIG. 5 that the main pulley 61 and the auxiliary pulley 62 each have a diameter substantially twice the diameter of the pulleys on the planetary shafts, thereby causing the planetary shafts to be rotated at a rotational speed substantially corresponding to that of the disc 20, but in an opposite direction.

As noted above, the auxiliary pulley 62 is rotatably mounted on the fixed central shaft 19. This being the case, the third planetary shaft 52 will rotate in an erratic manner as the disc 22 is rotated. Means are provided, however, for selectively preventing the rotation of the auxiliary pulley 62 on the central shaft to thereby cause the third planetary pulley 52 to rotate at the same rotational speed as the disc 20 but in the opposite direction such that the electron representing members 57 and 58 will trace a pair of intersecting elliptical orbits as illustrated in FIG. 7. The means for preventing rotation of the auxiliary pulley 62 includes a translatable plunger 80 extending through the front panel 17 so as to be adapted to extend through one of the apertures in the auxiliary pulley and thereby prevent its rotation. The movement of the plunger 80 is controlled by a solenoid 81, which when actuated, acts to withdraw the plunger 80 from contact with the auxiliary pulley 62. In addition, a spring 82 acts to bias the plunger outwardly to engage the pulley 62 when the solenoid is nonoperative.

As best seen in FIG. 1, the disc 20 includes a pair of circular apertures 84 and 85 extending therethrough and positioned radially from the central axis. A light housing 86 and bulb 87 are mounted in the front panel 17 in axial alignment with these apertures such that the light emanating from the bulb 87 is periodically visible through the apertures during rotation of the disc. This results in pulses or flashes of light which simulate the production of electromagnetic energy within the atom. In addition, a filter strip 88 which includes a plurality of variously colored filters 89 is mounted on the front panel 17 in front of the housing 86 such that the filters 89 may be selectively moved in front of the housing and the light from the bulb 87 simulates the various wave lengths of the visible light range of the electromagnetic energy spectrum. In this regard, the panel mounts a pair of opposed channel members 90 and 91 for slidably mounting the filter strip 88 as best seen in FIG. 1.

Also as seen in FIG. 1, the frame includes a pictorial display 93 comprising a number of inwardly directed arrows 94 carried by the front panel at an elevation above the disc 20. A light housing 95 and bulb 96 are mounted on the opposite side of the panel such that when the bulb 96 is illuminated the arrows 94 become visible to an observer. This pictorial display is adapted to simulate the approach of interference to the atom such as heat, pressure or radiation.

To control the operation of the apparatus, there is provided a master control switch 100 which includes a first switch 101 for operating the motor 14 and ultraviolet lamp 16. A second switch 102 illuminates the bulb 87 to generate pulses of light emanating through the apertures 84 and 85, and a third switch 103 operates the solenoid 81 to cause the erratic orbiting of the electron representing members 57 and 58 associated with the third planetary shaft. A fourth switch 104 serves to illuminate the bulb 96 of the pictorial display 93.

To initiate the operation, the first switch 101 is actuated to energize the motor 14 and ultraviolet lamp 16. Normally, the apparatus is operated in semi-darkness such that the ultraviolet light from the lamp 16 illuminates the fluorescent material of the nucleus representing means 28 and electron representing members 37, 38, 49, 50, 57, and 58, to highlight their visibility. Also, it will be understood that the remainder of the apparatus may be coated with a suitable non-reflective material so as to be substantially non-visible.

The motor 14 causes the disc 20 to rotate at a predetermined speed and direction, the rotation of the disc causing the planetary shafts 32, 40–43, and 52 to orbit the central shaft 20. Concurrently, the planetary shafts will be rotated in a direction opposite to the direction of rotation of the disc and at a corresponding rotational speed. By this arrangement, the electron representing members 37 and 38 of the first planetary shaft 32 trace a pair of intersecting elliptical orbits 105 and 106 respectively (note FIG. 7) about the nucleus representing means 28 to thereby provide a three dimensional representation of a pair of electrons orbiting the nucleus in an inner electron shell of the atom. The electron representing members 49 and 50 of the second planetary shafts 40–43 trace a total of eight intersecting elliptical orbits (the orbits of the members 49 and 50 associated with the shaft 42 being illustrated at 107 and 108 in FIG. 7) about the nucleus representing means 28 to thereby provide a three dimensional representation of eight electrons orbiting the nucleus in a second outer electron shell of the atom. Assuming that the plunger 80 is in engagement with the auxiliary pulley 62 to prevent its rotation, the electron representing members 57 and 58 of the third planetary shaft 52 trace an outermost pair of intersecting elliptical orbits 109 and 110 about said nucleus representing member 28 to thereby provide a three dimensional representation of a pair of electrons orbiting the nucleus in a third outermost electron shell of the atom. As noted above, the three separate electron shells of the atom may be highlighted by having the electron representing members of each shell colored differently from the members of the other shells.

As will be apparent, the initial orientation of the four second planetary shafts 40–43 will effect the placement of the orbits of the second shell in relation to each other. In particular, when the transverse rods 45 are aligned such that each lies at an angle of 45° with respect to each of the adjacent rods, and at an angle of 90° with respect to the opposite rod, the orbits of the electron representing members will be disposed in eight different angular orientations. This initial orientation of the transverse rods 45 is best illustrated in FIG. 6. In this regard however, it will be noted that for the purposes of clarity of illustration, only two of the eight electron orbits of the second shell have been illustrated in FIG. 7.

When it is desired to simulate the approach of outside interference such as heat, pressure, or radiation toward the atom, the switch 104 is closed to illuminate the pictorial display 93. To demonstrate the effect of this interference on the atom, the switch 103 is then closed to actuate the solenoid 81 and thereby cause an erratic orbiting of the electron representing members 57 and 58 of the third shell. In addition, the switch 102 is closed to illuminate the bulb 87 and thereby generate pulses of light which are visible to the observer through the apertures 84 and 85 in the disc. This pulsing light simulates the production of electromagnetic energy which is believed to be produced as a result of the erratic electron orbit. The filter strip 88 may be suitably adjusted along the channel members 90 and 91 to illustrate the various wave lengths of the visible light range of the electromagnetic energy spectrum.

It will also be apparent that the above described apparatus is suitable for illustrating a variety of atomic structures by merely adding or removing various ones of the proton, neutron, and electron representing members. Thus for example, the helium atom may be illustrated by positioning two proton and two neutron representing members on the transverse plate 29, and two electron representing members on the end portions 35 and 36 of the transverse rod 34. The magnesium atom is illustrated when twelve proton and twelve neutron representing members are positioned on the plate 29, and all of the electron representing members of the illustrated apparatus are in position. The magnesium ion may then be illustrated by removing the two electron representing members 57 and 58 from the outermost shell. Since the end portions of the various rods upon which the electron representing members are mounted are substantially non-visible under ultraviolet light, these empty positions will not be visible during operation of the apparatus.

In the drawings and specification, there has been set forth a preferred embodiment of the invention, and although specific terms are employed, they are used in a generic and descriptive sense only and not for purposes of limitation. Thus for example, while the neutron, proton and electron representing members have been described as being releaseably attached to the apparatus by magnetic means, it will be appreciated that a suitable mechanical interconnection could be employed rather than such magnetic means.

That which is claimed is:

1. An apparatus for demonstrating the theoretical structure of an atom to students and other observers and comprising a frame defining a central axis, a disc mounted on said frame for rotation about said central axis, said disc including a forwardly facing front surface, means for representing the nucleus of an atom mounted on said frame along said central axis and forwardly of said front surface, a shaft rotatably carried by said disc, said shaft defining a shaft axis extending parallel to and radially spaced from said central axis and including a forward end positioned forwardly of said front surface, a transverse member mounted at said forward end of said shaft and extending perpendicular to said shaft axis, said transverse member including two end portions with said two end portions being positioned on opposite sides of said shaft and substantially equidistant therefrom, means for representing an electron carried at each of said two end portions, means for rotating said disc in a first direction about said central axis and at a predetermined rotational speed, and means for rotating said shaft about said shaft axis while said disc is rotated and in a direction opposite said first direction and at a rotational speed substantially corresponding to said predetermined rotational speed such that said electron representing means traces a pair of intersecting elliptical orbits about said nucleus representing means to thereby provide a three dimensional representation of a pair of electrons orbiting the nucleus of an atom.

2. The apparatus as defined in claim 1 wherein said nucleus representing means includes a transverse plate comprising a magnetic material and a plurality of magnets adapted to be magnetically attached to said plate, said two end portions of said transverse member each comprise a magnetic material, and said electron representing means includes a magnet adapted to be magnetically attached to each of said end portions, whereby the magnets of said nucleus representing means and said electron representing means may be selectively attached to and removed from said apparatus to illustrate different atomic structures.

3. The apparatus as defined in claim 2 wherein said magnets of said nucleus representing means and said electron representing means each include a colored fluorescent material, and said apparatus further includes an ultraviolet lamp for illuminating said fluorescent material.

4. An apparatus for demonstrating the theoretical structure of an atom to students and other observers and including provision for demonstrating the theoretical electron shells of various atoms, said apparatus comprising a frame including a central shaft which defines a central axis, a disc rotatably mounted on said central shaft for rotation about said central axis, said disc including a forwardly facing front surface, means for representing the nucleus of an atom mounted on said central shaft forwardly of said front surface, a first planetary shaft rotatably carried by said disc, said first planetary shaft defining a first shaft axis extending parallel to and radially spaced from said central axis and including a forward end positioned forwardly of said front surface of said disc, a first pair of electron representing members carried at said forward end of said first planetary shaft and radially spaced from said first shaft axis, a plurality of second planetary shafts rotatably carried by said disc, each of said second planetary shafts defining a second shaft axis extending parallel to and radially spaced from said central axis, said second shaft axes being positioned in a generally circular arrangement about said central axis and radially beyond said first shaft axis, each of said second planetary shafts including a forward end positioned forwardly of said front surface of said disc, a second pair of electron representing members carried at said forward end of each of said second planetary shafts and radially spaced from the associated second shaft axis, means for rotating said disc in a first direction about said central axis at a predetermined rotational speed, and means for rotating said first planetary shaft about said first shaft axis and each of said second planetary shafts about the associated second axis while said disc is rotated, the rotation of said first and second planetary shafts being in a direction opposite said first direction and at a rotational speed substantially corresponding to said predetermined rotational speed, such that said first pair of electron representing members traces a first pair of intersecting elliptical orbits about said nucleus representing means to thereby provide a three dimensional representation of a pair of electrons orbiting the nucleus in an inner electron shell of an atom, and said second pairs of electron representing members trace a number of intersecting elliptical orbits about said nucleus representing means to thereby provide a three dimensional representation of a number of electrons orbiting the nucleus in a second outer electron shell of the atom.

5. The apparatus as defined in claim 4 wherein said apparatus comprises four of said second planetary shafts to thereby represent eight electrons orbiting in the second shell of the atom.

6. The apparatus as defined in claim 5 wherein the two electron representing members of each of said second pairs are disposed 180° apart on opposite sides of the associated second axis and equidistant therefrom, and said four second pairs of electron representing members are oriented in relation to each other such that a line formed between the two electron representing members of each pair lies at an angle of 45° with respect to the lines formed between the two electron representing members of each of the adjacent pairs and at an angle of 90° with respect to a line formed between the two electron representing members of the opposite pair such that the orbits of the electron representing members are disposed in different angular orientations.

7. The apparatus as defined in claim 4, wherein said apparatus further comprises a third planetary shaft rotatably carried by said disc, said third planetary shaft defining a third shaft axis extending parallel to said central axis and radially beyond said second shaft axes, said third planetary shaft including a forward end positioned forwardly of said front surface of said disc, a third pair of electron representing members carried at said forward end of said third planetary shaft and radially spaced from said third shaft axis, and means for rotating said third planetary shaft about said third shaft axis while said disc is rotated, the rotation of said third shaft being in a direction opposite said first direction and at a rotational speed substantially corresponding to said predetermined rotational speed, such that said third pair of electron representing members traces an outermost pair of intersecting elliptical orbits about said nucleus representing means to thereby provide a three dimensional representation of a pair of electrons orbiting the nucleus in a third outermost shell of the atom.

8. The apparatus as defined in claim 7 wherein said central shaft is fixedly mounted to preclude the rotation thereof, and said means for rotating said first and second planetary shafts comprises a main pulley fixedly mounted on said central shaft rearwardly of said disc, first pulley means fixedly mounted on said first pulley shaft rearwardly of said disc, second pulley means fixedly mounted on each of said second planetary shafts and rearwardly of said disc, and belt means for operatively interconnecting said main pulley with said first and second pulley means whereby each of said first and second planetary shafts are rotated upon the disc being rotated.

9. The apparatus as defined in claim 8 wherein said means for rotating said third planetary shaft comprises an auxiliary pulley rotatably mounted on said central shaft rearwardly of said disc, third pulley means fixedly mounted on said third pulley shaft rearwardly of said disc, and auxiliary belt means for operatively interconnecting said auxiliary pulley and said third pulley means.

10. The apparatus as defined in claim 9 wherein said means for rotating said third planetary shaft comprises means for selectively preventing rotation of said auxiliary pulley on said central shaft whereby said third pair of electron representing members may be made to trace an elliptical orbit when said auxiliary pulley is prevented from rotating and made to trace an erratic orbit when said auxiliary pulley is free to rotate, such erratic orbit simulating the instability which occurs in the atom from certain outside interference.

11. The apparatus as defined in claim 10 wherein said disc includes an aperture extending therethrough and positioned radially from said central axis, and said frame includes a panel mounted rearwardly of said disc, and light means mounted on said panel in axial alignment with said aperture in said disc such that light emanating from said light means is periodically visible through said aperture during rotation of said disc to thereby simulate the production of electromagnetic energy within the atom.

12. The apparatus as defined in claim 11 wherein said frame further includes a plurality of variously colored filters, and means for mounting said filters on said panel for selective movement in front of said light means such that the light means may simulate the various wave lengths of the visible light range of the electromagnetic energy spectrum.

13. The apparatus as defined in claim 12 wherein said frame further includes pictorial display means carried on said panel for simulating the approach of intereference to the atom, and means for selectively illuminating said pictorial display means.

* * * * *